United States Patent [19]

Ryan

[11] Patent Number: 5,031,355

[45] Date of Patent: Jul. 16, 1991

[54] STEAM ARRANGEMENT FOR EXTERMINATING THE ARGENTINA FIRE ANT

[76] Inventor: Dennis H. Ryan, P.O. Box 810, Hazlehurst, Miss. 39083

[21] Appl. No.: 417,498

[22] Filed: Oct. 5, 1989

[51] Int. Cl.$^5$ .......................................... A01M 19/00
[52] U.S. Cl. .................................................. 43/130
[58] Field of Search .............. 43/129, 130; 122/13 R, 122/476, 477, 486, 487

[56] References Cited

U.S. PATENT DOCUMENTS

| | | | |
|---|---|---|---|
| 1,689,745 | 10/1928 | Nichols | 122/13.1 |
| 1,926,958 | 9/1933 | Peterson | 122/13.1 |
| 3,636,929 | 1/1972 | Sanders | 122/476 |
| 4,637,161 | 1/1987 | Turner | 43/130 |
| 4,675,963 | 6/1987 | Franzolini | 122/476 |
| 4,867,106 | 9/1989 | Staats | 122/13.1 |

Primary Examiner—Kurt Rowan
Assistant Examiner—James Miner
Attorney, Agent, or Firm—Michael I. Kroll

[57] ABSTRACT

An exterminating arrangement for exterminating the Argentina Fire Ant is disclosed. The arrangement includes a holding and pressure tank, a heat exchanger in fluid communication with the holding and pressure tank, a superheater in fluid communication with the heat exchanger, and a dome in fluid communication with the superheater.

15 Claims, 2 Drawing Sheets

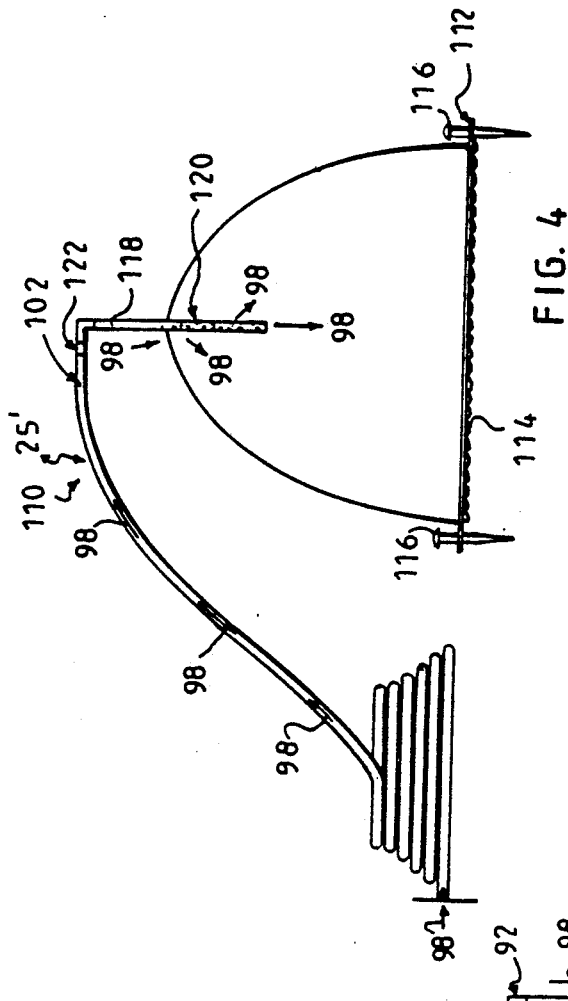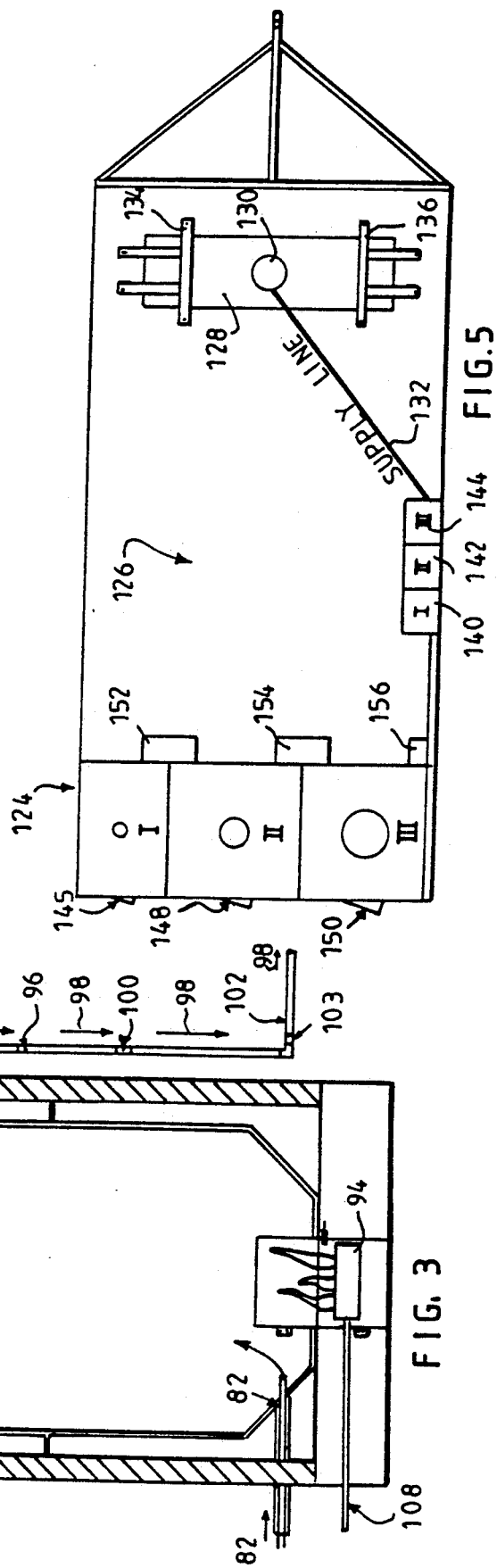

STEAM ARRANGEMENT FOR EXTERMINATING THE ARGENTINA FIRE ANT

BACKGROUND OF THE INVENTION

1. Field of the Invention

The present invention relates to an exterminating arrangement.

More particularly, the present invention relates to an exterminating arrangement specifically for the Argentina Fire Ant.

2. Description of the Prior Art

Numerous innovations for exterminating arrangements have been provided in the prior art that are adapted to be used. Even though these innovations maY be suitable for the specific individual purposes to which they address, they would not be suitable for the purposes of the present invention as heretofore described.

SUMMARY OF THE INVENTION

Accordingly, it is an object of the present invention to provide an arrangement for exterminating Argentina Fire Ants that avoids the disadvantages of the prior art.

More particularly, it is an object of the present invention to provide an exterminating arrangement which was designed for the annihilation of the Argentina Fire Ant Colony.

The system of the present invention does not give off any harmful chemicals to man, beast or wildlife. The present invention will enhance mankind as a whole and for future generations to come.

In keeping with these objects, and with others which will become apparent hereinafter, one feature of the present invention resides, briefly stated, in an exterminating machine, comprising, a holding and pressure tank, a heat exchanger in fluid communication with the holding and pressure tank, a super heater in fluid communication with the heat exchanger, wherein a dome is in fluid communication with the super heater.

When the arrangement for exterminating Argentina Fire Ants is designed in accordance with the present invention, the Argentina Fire Ant, its colony, and its Queen will be annihilated.

In accordance with another feature of the present invention, the holding and pressure tank contain an input of cold water and an output of heated water.

Another feature of the present invention is that the heat exchanger contains an input of the heated water from the output of the holding and pressure tank, and an output of steam droplets.

Yet another feature of the present invention is that the super heater contains an input of the steam droplets from the output of the heat exchanger, and an output of super heated steam.

Still another feature of the present invention is that the dome contains an input of the super heated steam from the output of the super heater.

Yet still another feature of the present invention is that the holding and pressure tank contains a capacity for holding up to 40 gallons of water.

Still yet another feature of the present invention is that the water reaches a pressure of 75 P.S.I. and a temperature of 320.1° F. while in the holding and pressure tank.

Another feature of the present invention is that it further comprises a lift tube, a temperature probe, a burner, and a pressure regulator, the heated water is lifted up the lift tube to the temperature probe, the temperature probe is regulated by the burner which is putting out 50,000 B.T.U.'s the lift tube is made of galvanized pipe, and the heated water enters the pre-set pressure regulator, set at 75 P.S.I.

Yet another feature of the present invention is that it further comprises a cut-off valve, the heated water travels to the cut-off valve, the cut-off valve is used primarily onlY for refilling purposes and for temporary shut-downs.

Still another feature of the present invention is that it further comprises a temperature gauge, and a check valve, the heated water leaves the holding and pressure tank and enters the heat exchanger.

Yet still another feature of the present invention is that it further comprises a pressure relief valve, the pressure relief valve prevents the holding and pressure tank from exploding if the internal pressure becomes excessive for the holding and pressure tank.

Still yet another feature of the present invention is that it further comprises a filler valve, and a filler tube so that the cold water can refill the holding and pressure tank, when necessary.

Another feature of the present invention is that it further comprises insulation wrapped around the holding and pressure tank so that heat loss from the holding and pressure tank is minimized.

Yet another feature of the present invention is that it further comprises a gas supply line feeding the burner, a cap vent, and a baffle tube, the burner is disposed under the baffle tube, the baffle tube contains a perforated plate, and the baffle passes through the holding and pressure tank, and terminates with the cap vent.

Still another feature of the present invention is that it further comprises a coil, the heated water enters the coil.

Yet still another feature of the present invention is that :he coil, when unwound, is 453 linear feet long with a 7/8" O.D.

Still yet another feature of the present invention is that it further comprises a safety valve, the heated water transforms into steam droplets, and the steam droplets travels through the coil and into the safety valve.

Another feature of the present invention is that the steam droplets contained in the safety valve have a temperature of 387.9° F. and a pressure of 100 P.S.I.

Yet another feature of the present invention is that it further comprises a temperature gauge, a temperature probe, and a burner, the temperature gauge and the temperature probe are regulated by the burner, and the burner puts out 100,000 B.T.U.

Still another feature of the present invention is that the steam droplets pass through the check valve and into the super heater.

Yet still another feature of the present invention is that the steam droplets enter the super heater at a temperature of 387.9° F.

Still yet another feature of the present invention is that the steam droplets in the super heater reach a temperature of 775.8° F., and a pressure of 150 P S.I.

Another feature of the present invention is that the super heated steam passes through the temperature probe, which is connected to the pressure regulator.

Yet another feature of the present invention is that it further comprises a temperature gauge and a flex hose that has a steel adaptor, the super heated steam enters the pressure regulator, continues to pass through the temperature gauge, and then to the flex hose.

Still another feature of the present invention is that it further comprises a dome secured to the ground by cleats and a strap.

Yet still another feature of the present invention is that the super heated steam enters the dome, the super heated steam has a pressure of 150 P.S.I. and a temperature of 775.8° F.

Still yet another feature of the present invention is that the steel hose adaptor allows the perforated pipe to obtain a fixed position, and the pipe contains perforations so that the super heated steam is disposed within the dome.

The novel features which are considered characteristic for the invention are set forth in particular in the appended claims. The invention itself, however both as to its construction and its method of operation, together with additional objects and advantages thereof, will be best understood from the following description of the specific embodiments when read in connection with the accompanying drawing.

BRIEF DESCRIPTION OF THE DRAWING

FIG. 3 is a cross-sectional view of the super heater of the present invention that converts the steam droplets into superheated steam;

FIG. 4 is a cross-sectional view of the dome of the present invention containing the superheated steam; and FIG. 5 is a plan view of an alternate embodiment of the present invention, a trailer has all of the necessary parts of the present invention disposed on its deck in the manner of the alternate embodiment so that self-contained unit is provided.

LIST OF REFERENCE NUMERALS UTILIZED IN THE DRAWING

Figure 2:
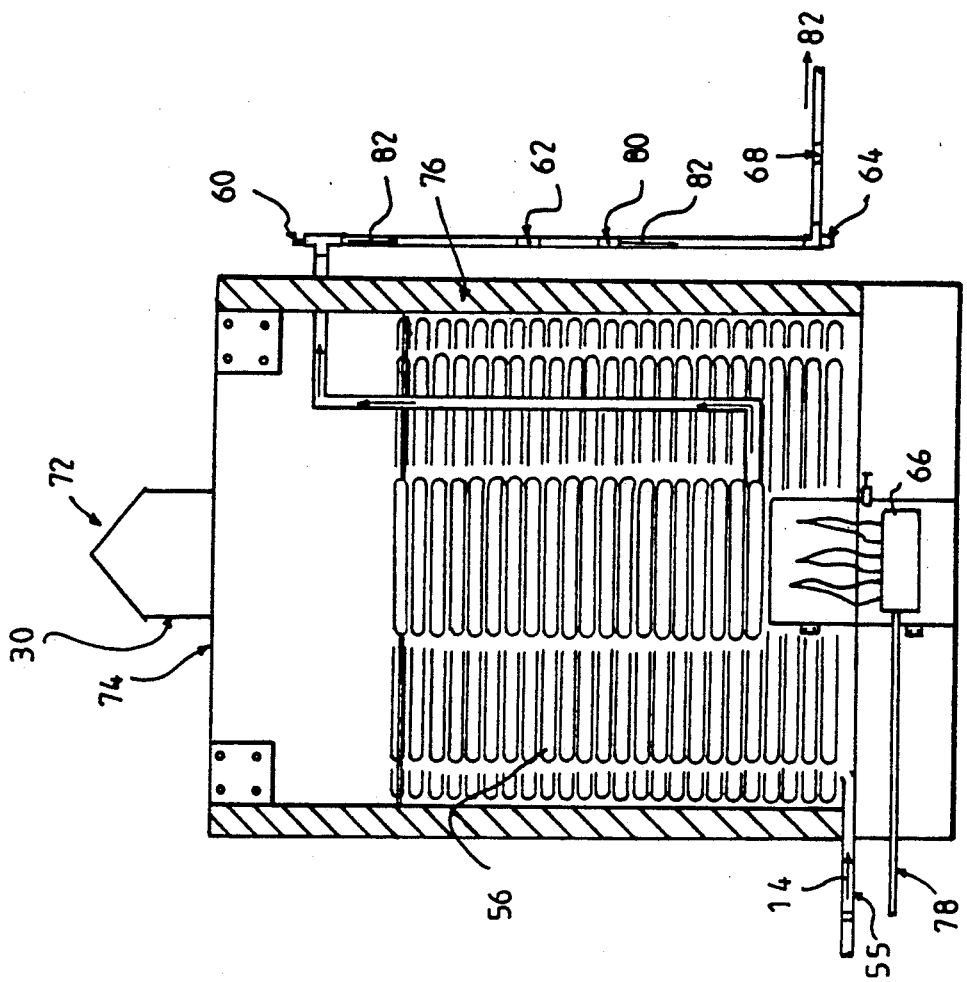
FIG. 2 is a cross-sectional view of the heat exchanger of the present invention that converts water into steam droplets.

10 - holding and pressure tank
12 - water in the holding and pressure tank 10
14 - heated water leaving the holding and pressure tank 10
16 - lift tube of the holding and pressure tank 10
18 - temperature probe of the holding and pressure tank 10
20 - burner of the holding and pressure tank 10
22 - pre-set pressure regulator of the holding and pressure tank 10
24 - cut-off valve of the holding and pressure tank
26 - temperature valve of the holding and pressure tank 10
28 - check valve of the holding and pressure tank 10
30 - heat exchanger
32 - galvanized pipe connecting the holding and pressure tank 10 to the heat exchanger 30
34 - pressure relief valve of the holding and pressure tank 10
36 - filler valve of the holding and pressure tank 10
38 - filler tube of the holding and pressure tank 10
40 - insulation disposed around the holding and pressure tank 10
42 - gas supply line for the holding and pressure tank 10
44 - steel pipe for the holding and pressure tank 10
46 - baffle of the steel pipe 44
48 - perforated plate contained in the baffle 46
50 - throughbore in the holding and pressure tank 10
52 - steel cap vent for terminating the pipe 44 of the holding and pressure tank 10
54 - steel pipe of the heat exchanger 30
56 - coil of the steel pipe 54
60 - safety valve the heat exchanger 30
62 - temperature gauge of the heat exchanger 30
64 - temperature probe of the heat exchanger 30
66 - burner of the heat exchanger 30
68 - check valve
72 - steel plate cap of the heat exchanger 30
74 - perforated baffle of the heat exchanger 30
76 - insulation wrapped around the heat exchanger 30
78 - gas supply line for the heat exchanger 30
80 - pressure gauge
82 - steam leaving the heat exchanger 30 and entering the super heater 90
90 - super heater
92 - temperature probe of the super heater 90
94 - burner of the super heater 90
96 - pressure regulator of the super heater 90
98 - super heated steam
100 - temperature gauge of the super heater 90
102 - flex hose of the super heater 90
103 - steel adaptor of the super heater 90
104 - steel cap of the super heater 90
106 - insulation wrapped around the super heater 90
108 - gas supply line of the super heater 90
110 - dome
112 - ground of the dome 110
114 - strap of the dome 110
116 - cleat of the dome 110
118 - fixed portion of the flex hose 102
120 - perforated pipe of the dome 110
122 - hose adaptor of the dome 110
124 - trailer
126 - trailer deck of the trailer 124
128 - tank on the trailer deck 126
130 - aperture in the tank 128
132 - supply line for the tank 128
134 - roll bar for the tank 128
136 - roll bar for the tank 128
138 - surface of the tank 128
140 - first temperature controller on the trailer 124
142 - second temperature controller on the trailer 124
144 - third temperature controller on the trailer 124
146 - first burner on the trailer 124
148 - second burner on the trailer 124
150 - third burner on the trailer 124
152 - water line for the first burner 146 on the trailer 124
154 - water line for the second burner 148 on the trailer 124
156 - water line for the third burner 150 on the trailer 124

DETAILED DESCRIPTION OF THE PREFERRED EMBODIMENT

Figure 1:
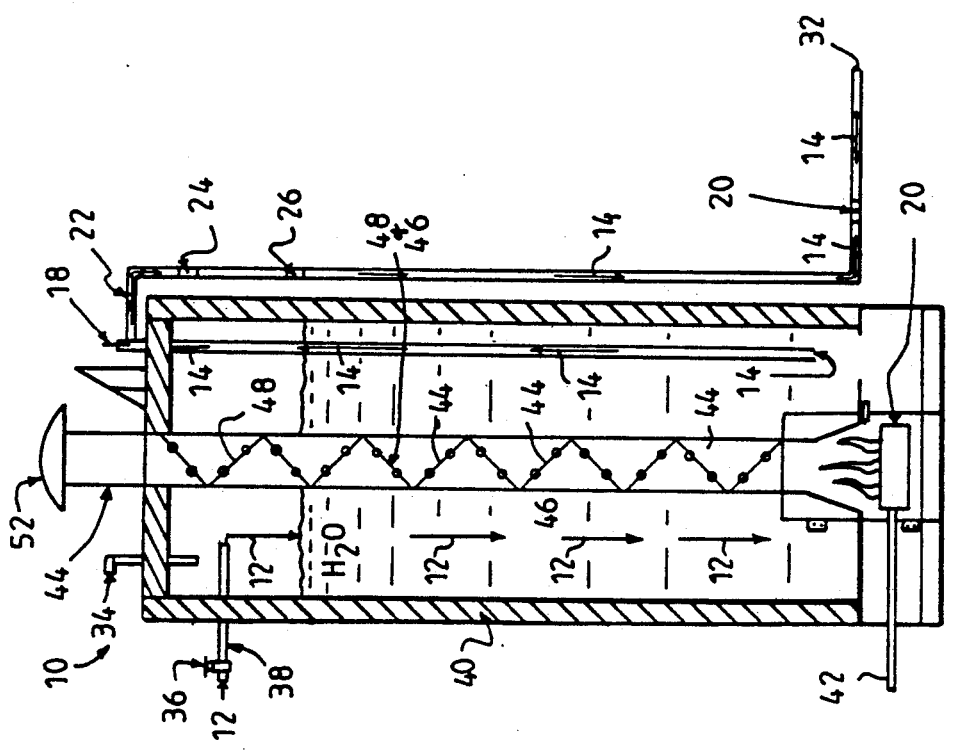
FIG. 1 is a cross-sectional view of the holding and pressure tank of the present invention.

Referring now to FIG. 1, the holding and pressure tank of the present invention is generally shown at 10 and contains a capacity for holding up to approximately 40 gallons of water 12.

The water 12 reaches a pressure of 75 P.S.I. and a temperature of 320.1° F. while in the holding and pressure tank 10.

The heated water 14 is lifted up the lift tube 16 to the temperature probe 18. The temperature probe 18 regulates the burner 20 which is putting out 50,000 B.T.U.

The lift tube 16 is made of galvanized pipe, but is not limited to it.

The heated water 14 enters the pre-set pressure regulator 22, which is set at 75 P.S.I.

The heated water 14 travels to the cut-off valve 24. The cut-oiff valve 24 is used primarily for only refill purposes and for temporary shut-down.

The heated water 14 then travels to the temperature gauge 26 and then to the check valve 28. The heated water 14 leaves the holding and pressure tank 10 and enters the heat exchanger 30, shown in FIG. 2, by way of a galvanized pipe 32, hut is not limited to it.

A pressure relief valve 34 prevents the holding and pressure tank 10 from exploding if the internal pressure becomes eXcessive for the holding and pressure tank 10.

A filler valve 36 and a filler tube 38 are positioned so that the water 12 can enter the holding and pressure tank 10.

The holding and pressure tank 10 further include insulation 40 wrapped around the entire holding and pressure tank 10, to help eliminate heat loss.

A gas supply line 42 feeds the burner 20. The burner 20 is disposed under a steel pipe 44 which functions as a baffle 46 by containing perforated plate 48. The baffle 46 passes through a throughbore 50 and terminates at a cap vent 52.

Referring now to FIG. 2, the heat exchanger of the present invention is shown generally at 30.

The heated water 14 enters the pipe 54 which is made into a coil 56. The coil 56 is 453 linear feet long, with a 7/8' O.D.(SC-80)

The heated water 14 is then changed into steam droplets 58. The steam droplets 58 travel through the coil 56 and into the safety valve 60.

The steam droplets 58, at this point, have reached a temperature of 387.9° F. and a pressure of 150 P.S.I.

The steam droplets 58 enter the temperature gauge 62, and the temperature probe 64, which is regulated by the burner 66 that is putting out 100,000 B.T.U.

At this point, the steam droplets 58 pass through the check valve 68, and into the superheater 90.

A steel plate cap 72, but not limited to it, a perforated baffle 74, insulation 76 disposed around the heat exchanger 30, and a pressure gauge 80 are all utilized in the operation of the heat exchanger 30.

Referring now to FIG. 3, the superheater of the present invention is shown generally at 90.

Steam droplets 58 enter the superheater 90 at a temperature of 387.9° F. The steam droplets 58, at this point, have reached a temperature of 775.8° F., and a pressure of 150 P.S.I.

The super heated steam 98 passes through the temperature probe 92, which is connected to the pressure regulator 96.

The super heated steam 98 enters the pressure regulator 96, then enters the temperature gauge 100, and then into a flex hose 102 which has a steel adaptor 103.

A steel cap 104, but not limited to it insulation 106 disposed around the superheater 90, and gas supply line 108, of the superheater 90 are all utilized in the operation of the superheater 90.

Referring no to FIG. 4, the dome of the present invention is shown generally at 110. The dome 110 is secured to the ground 112 by means of a strap 114 and cleats 116.

Pressure is released at the superheater 90 through the flex hose 102, by means of a shut off valve-ball type.

The super heated steam 98 enters the dome 110 by way of the flex hose 102. The flex hose 102 is placed in the ground 112 with super heated steam pressure of 150 P.S.I. and a temperature of 775.8° F., to a depth of 72" to 94", via underground passage ways created by the Argentina Fire Ants. The entire colony including the Queen are destroyed by means of the exterminating capabilities of the present invention.

The steel hose adaptor 122 allows the perforated pipe 120 to obtain a fixed portion 118 of the flex hose 102. The perforated pipe 120 contains perforations so that the super heated steam 98, is disposed within the dome 110.

Referring now to FIG. 5, the alternate embodiment of the present invention is a trailer 124, that is portably movable. The trailer deck 126 contains all of the necessary equipment to exterminate the Argentina Fire Ant.

An 80 gallon tank 128, has an aperture 130. The supply line 132 feeds the tank 128, via the supply line 132. The tank 128 has two roll bars 134 and 136 disposed about its surface 138 to prevent the tank 128 from rolling.

The supply line 132 connects to the three temperature controllers 140, 142, and 144.

The temperature controller 140 regulates the temperature of the first burner 146. The temperature controller 142 regulates the temperature of the second burner 148. And, the temperature controller 144 regulates the temperature of the third burner 150.

As can be seen in FIG. 5, each of the burners 146, 148, and 150 have their own dedicated gas lines 152, 154, and 156, respectively.

It will be understood that each of the elements described above, or two or more together, may also find a useful application in other types of constructions differing from the type described above.

While the invention has been illustrated and described as embodied in an arrangement for exterminating the Argentina Fire Ant, it is not intended to be limited to the details shown, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. An exterminating arrangement comprising:

a) a gas fired holding and pressure tank for generating high temperature water and being void of the need of a preheating chamber, said holding and pressure tank contains an input of cold water and an output of heated water, said gas fired holding and pressure tank including a lift tube, a temperature probe, a burner, and a pre-set pressure regulator, said heated water being lifted up said lift tube to said temperature probe, said temperature probe being regulated by said burner which is putting out 50,000 B.T.U., said lift tube being made of galvanized pipe, said heated water entering said pre-set pressure regulator which is set at 75 P.S.I., a gas supply line feeding said burner, a cap vent, and a baffle tube, said burner being disposed under said baffle tube, said baffle tube containing a perforated plate, said baffle passing through said holding and pressure tank and terminating at said cap vent;

b) a gas fired heat exchanger for generating steam droplets and being in fluid communication with said gas fired holding and pressure tank, said heat exchanger contains an input of said heated water from said output of said holding and pressure tank, and an output of steam droplets, said gas fired heat exchanger including a coil, said heated water entering said oil, a temperature gauge, and a temperature probe, said temperature gauge and said temperature probe being regulated by said burner, said burner putting out 100,000 B.T.U.;

c) a gas fired vertically disposed superheater for generating super heated steam droplets and being in fluid communication with said gas fired heat exchanger, said superheater contains an input of said steam droplets from said output of said heat exchanger, and an output of super heated steam, said gas fired super heater including a temperature gauge and a readily flexible flex hose that has a steel adaptor, said super heated steam enters said pressure regulator, enters said temperature gauge, and then enters said readily flexible flex hose; and d) a dome for collecting said super heated steam droplets and being in fluid communication with said gas fired superheater, said dome contains an input of said super heated steam from said output of said superheater, said dome including a perforated pipe, said steel hose adaptor allows said perforated pipe to obtain a fixed position, said pipe containing perforations so that said super heated steam is disposed within said dome, said dome being strapped and seated into the ground and assumes a one piece substantially parabolic configuration.

2. An arrangement as defined in claim 1, wherein said holding and pressure tank contains a capacity for holding up to 40 gallons of water.

3. An arrangement as defined in claim 2, wherein said water reaches a pressure of 75 P.S.I. and a temperature of 320.1° F., while in said holding and pressure tank. refill purposes and for temporary shut-down, only.

4. An arrangement as defined in claim 3; further comprising a temperature gauge and a check valve, said heated water leaving said holding and pressure tank and entering said heat exchanger.

5. An arrangement as defined in claim 4; further comprising a pressure relief valve, said pressure relief valve preventing said holding and pressure tank from exploding if the internal pressure becomes excessive for said holding and pressure tank.

6. An arrangement as defined in claim 5; further comprising a filler valve and a filler tube so that said cold water can refill said holding and pressure tank, when necessary.

7. An arrangement as defined in claim 6; further comprising insulation wrapped around said holding and pressure tank so that heat loss is minimized.

8. An arrangement as defined in claim 7, wherein said coil is 453 linear feet long and having a 7/8" O.D.

9. An arrangement as defined in claim 8; further comprising a safety valve, said heated water transforming into steam droplets, said steam droplets traveling through said coil and into said safety valve.

10. An arrangement as defined in claim 9, wherein said steam droplets in said safety valve have a temperature of 387.9° F. and a pressure of 100 P.S.I.

11. An arrangement as defined in claim 10, wherein said steam droplets pass through said check valve and into said superheater.

12. An arrangement as defined in claim 11, wherein said steam droplets enter said superheater at a temperature of 387.9° F.

13. An arrangement as defined in claim 12, wherein said steam droplets in said superheater reach a temperature of 775.8° F., and a pressure of 150 P.S.I.

14. An arrangement as defined in claim 13, wherein said super heated steam passes through said temperature probe which is connected to said pressure regulator.

15. An arrangement as defined in claim 14, wherein said super heated steam enters said dome, said super heated steam having a pressure of 150 P.S.I. and a temperature of 775.8° F.

* * * * *